United States Patent [19]

Neal

[11] 4,014,236
[45] Mar. 29, 1977

[54] PORTABLE, STRAIGHT AND SQUARE, VARIABLE ANGLE OR MULTI-ANGLE SAWING GUIDE

[76] Inventor: Edwin S. Neal, 1514 Maryland Ave., Charlotte, N.C. 28209

[22] Filed: Feb. 8, 1974

[21] Appl. No.: 435,527

[52] U.S. Cl. .................................. 83/745; 83/761
[51] Int. Cl.² .......................................... B27B 9/04
[58] Field of Search ............................ 83/745, 761

[56] References Cited

UNITED STATES PATENTS

| 778,178 | 12/1904 | Dotts | 83/761 |
| 3,741,063 | 6/1973 | Bretthauer | 83/745 |
| 3,757,628 | 9/1973 | Camacho | 83/745 |

Primary Examiner—Willie G. Abercrombie
Attorney, Agent, or Firm—Gardiner, Sixbey, Bradford & Carlson

[57] ABSTRACT

The sawing guide consists of a guide plate, a press plate, two swivel bolt assemblies, and a plurality of pitch blocks. The press plate and guide plate are positioned on either side of an object to be cut and are secured together by the two swivel bolt assemblies which extend along either side of the object. Pitch blocks are then inserted between the object and the guide plate to vary the attitude of the guide plate.

7 Claims, 16 Drawing Figures

U.S. Patent  Mar. 29, 1977  Sheet 1 of 2  4,014,236
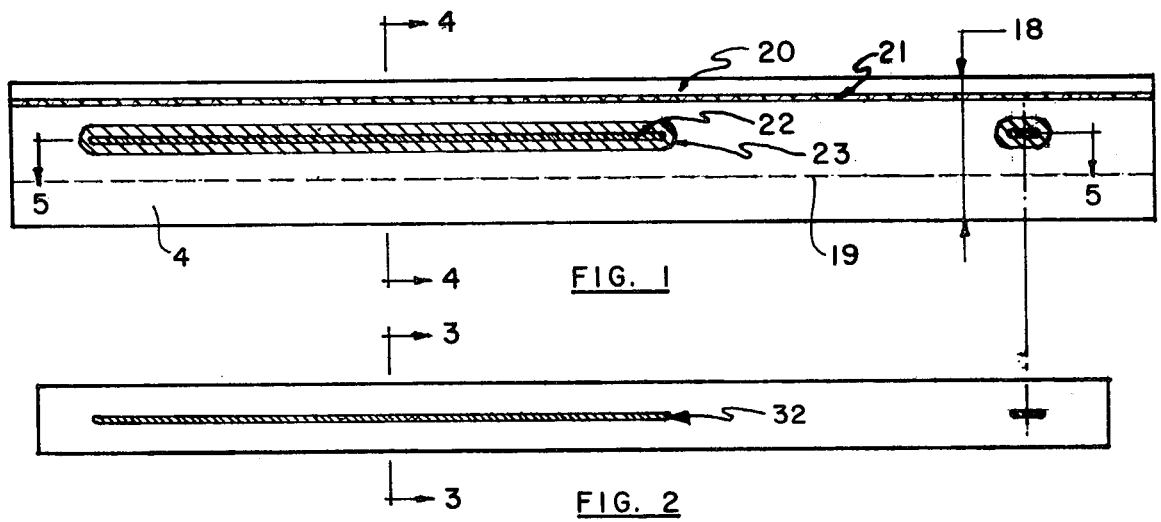
FIG. 1
FIG. 2
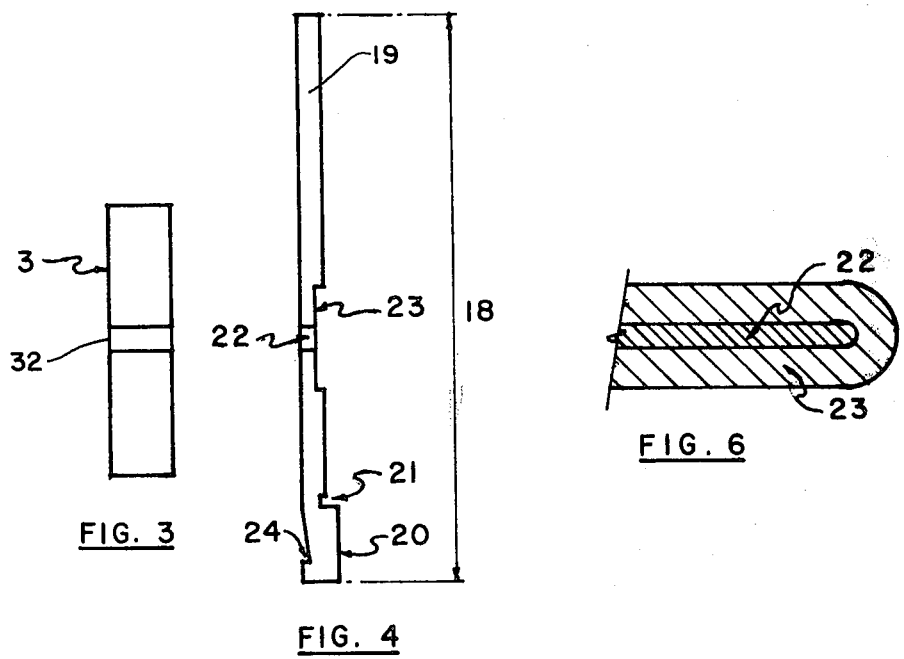
FIG. 3
FIG. 4
FIG. 6

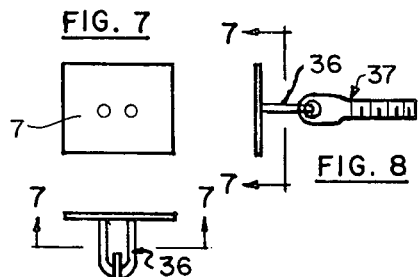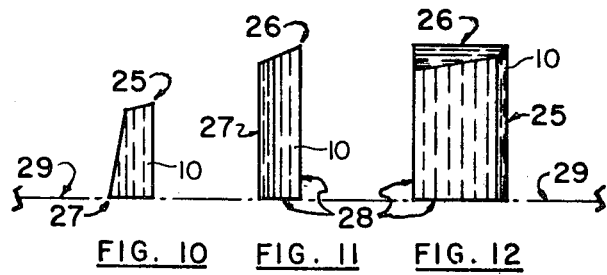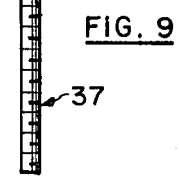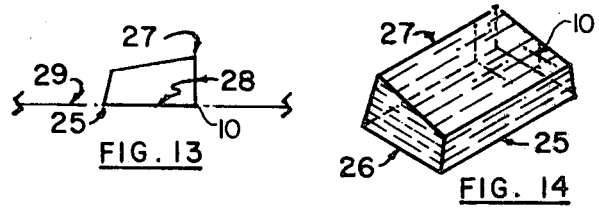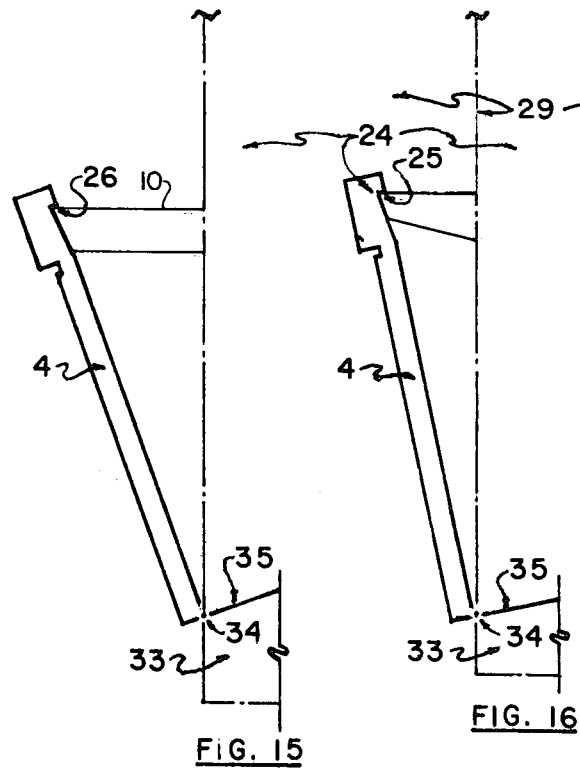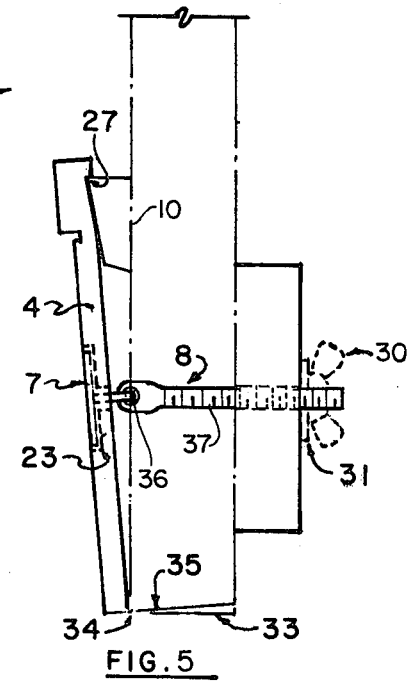

PORTABLE, STRAIGHT AND SQUARE, VARIABLE ANGLE OR MULTI-ANGLE SAWING GUIDE

SUMMARY OF THE INVENTION

This invention will be used in co-operation with handheld, electrically powered, circular saws and will enable the users to cut boards and board like objects straight across or angularly across said objects with a square or an angular beveled edge.

Said operations may be accomplished with expediency and precision not otherwise attainable at the work site. The inventor acknowledges that equal or near equal precision may be achieved by the most proficient practicing carpenters but only upon sacrifice of expediency. Additionally such expediency and precision may be achieved by carpenters of minimal proficiency or even carpentry hobbiests. The invention also facilitates a cut cross or bevel, from or to zero depth, this being an extremely difficult task for any carpenter. The inventor also acknowledges that all the above described work may be achieved with equal expediency and precision at any adequately equipped woodworking machine shop, however the invention can be produced and marketed for an amount less than the wages and overhead for a carpenter and helper to transport the objects to be cut, a set of doors for instance, to and from such a shop. Finally the guide plate protects any prefinished object to be cut from damage resulting from contact with the base plate of hand held saws or the bench of a fixed machine shop saw.

A primary object of the present invention is to provide a novel and improved sawing guide for hand held, electrically powered circular saws which will protect prefinished objects to be cut from damage resulting from contact with the base plate of the saw.

Another object of the present invention is to provide a novel and improved sawing guide which is simple in construction, inexpensive, and which may be efficiently employed by inexperienced carpenters and carpentry hobbyists.

A still further object of the present invention is to provide a novel and improved sawing guide which may be rapidly attached to an object to be cut and which will permit the object to be cut at a number of controlled angles.

These and other objects of the present invention will become readily apparent upon a consideration of the following specification and claims taken in conjunction with the accompanying drawings in which:

FIG. 1 is a plan view of the guide plate for the sawing guide of the present invention;

FIG. 2 is a plan view of the press plate for the sawing guide of the present invention;

FIG. 3 is an enlarged sectional view along lines 3—3 of FIG. 2;

FIG. 4 is an enlarged sectional view along lines 4—4 of FIG. 1;

FIG. 5 is a view of the side elevation of the complete sawing guide of the present invention assembled against an object to be cut;

FIG. 6 is a plan view of the slot and recess of FIG. 1;

FIG. 7 is a plan view taken along lines 7—7 of FIG. 8;

FIG. 8 is a view in side elevation of a portion of the swivel bolt assembly used in the sawing guide of the present invention;

FIG. 9 is a plan view of the portion of the swivel bolt assembly of FIG. 8;

FIGS. 10, 11 and 12 are views in side elevation of a pitch block which may be employed for the sawing guide of the present invention;

FIG. 13 is a diagrammatic view of a pitch block which may be employed with the sawing guide of the present invention;

FIG. 14 is a perspective view showing the pitch block which is diagrammatically illustrated in FIG. 13; and FIGS. 15 and 16 are diagrammatic illustrations showing the guide plate of the present invention employed with the pitch block of FIGS. 11 and 10 respectively.

The basic sawing guide of the present invention assembled with relation to an object to be cut may best be understood with reference to FIG. 5. Here a press plate 3 and a guide plate 4 are positioned against opposite surfaces of an object to be cut and are secured together by two swivel bolt assemblies 8 positioned on either side of the object to be cut. Pitch blocks 10, with sides of various sizes and shapes, are placed between the object to be cut and the guide plate 4 to vary the attitude of the guide plate (FIGS. 15, 16 and 5). The swivel bolt assembly secures the press plate and guide plate by pressure to the object to be cut.

Considering now in detail the various parts of the saw guide of FIG. 5, the guide plate 4 (FIG. 1) shall be cut from a select grade of air dried hard wood. Upon being machine shaped as illustrated (FIGS. 1, 4 5 and 6) it shall be treated with a clear sealant to inhibit warping inherent in wood resulting from changing atmospheric conditions. Due to a difference in the dimensions of the base plates of various makes of saws with which the invention may be used, the guide plate shall be manufactured over-wide in the dimension indicated at 18. The saw with which the invention will be used is employed to cut the guide plate along line 19 with the motor-side edge of the saw's base plate guided by the inner face of a shoulder 20 formed in the guide plate. Recess 21 is provided in the guide plate to contain cutting residue (saw dust) so as to allow the edge of the saw's base plate to remain in contact with the inner face of shoulder 20 formed in the guide plate the top head 7 of the swivel bolt assembly (FIGS. 7 and 5) from interfering with cutting operations, while a slot 22 permits passage of a stirrup 36 and shank 37 for the swivel bolt assembly 8 (FIGS. 8 and 9). The elongated slot 22 and recess 23 permit moving the swivel bolt assembly (FIGS. 7, 8 and 9) on that side of objects to be cut that vary by dimension. Note than an angled notch or recess 24 is provided at one end of the guide plate beneath the shoulder 20 (FIGS. 4, 5, 15, 16). Point 34 sets the angle of cross and eliminates placing a line or scribe on surface of object to be cut.

The press plate 3 (FIG. 2) shall be produced from the same material as the guide plate and similarly treated as the guide plate (FIG. 1). A slot 32 in the press plate (FIG. 2) shall correspond in proportion to slot 22 (FIGS. 1, 3, 4, and 5.

The swivel bolt assembly 8 (FIGS. 7, 8 and 9) shall be produced from maelable steel in proportions as shown on drawings. Two swivel bolt assemblies are to be placed similarly as shown (FIG. 5) one each side of the object to be cut. Note that these assemblies include a washer 31 and hand tightened nut 30 to secure the assembly in place.

Each swivel bolt assembly includes a head 7 which is adapted to rest in the recess 23 of the guide plate. Welded to the head 27 and extending through the recess 23 is a stirrup 36 which pivotally retains a threaded shank 37 by means of an eye in the shank which receives the stirrup.

FIGS. 10-14 disclose a typical pitch block 10 having sides 28 which may be cut to various dimensions and edges 25, 26 and 27 cut to various angles which will correspond to the angle of the recess 24. Each individual pitch block will provide three different angles of bevel by selectively positioning the edges 25, 26, and 27 of the block in the beveled recess 24 as indicated in FIGS. 15, 16 and 5 respectively. Each angular face of each pitch block shall be marked to indicate the angle of bevel to be had by placing such marked face in the recess 24.

The pitch block 10 (FIGS. 10 through 14) and optional variations shall be produced from material similar to that from which guide plate 4 is made, and the pitch blocks are similarly treated. Two blocks 10 of similar proportion are placed with one block at each edge of object to be cut. It is acknowledged that the base plate of all such saws as may be used with the invention, can be tilted to obtain bevel cuts, however, such tilting as a substitute for the use of the pitch block would result in a bevel cut of the face 19 of guide plate (FIG. 1) along line 19 which would remove point 34 (FIGS. 15, 16 and 5) which is critical to the alignment of cross cutting of object to be cut.

Note 33 (FIGS. 15, 16 and 5) indicates the portion of the object to be removed by the cutting there-of and 35 indicates the different angles of bevel provided by the pitch block 10.

I claim:

1. A sawing guide for guiding a circular saw having a flat base plate during the sawing of an object comprising guide plate means for engaging said circular saw to control the line of cut and angle of cut made by the saw, angle controlling means adapted to engage said object and extend between said object and said guide plate means, and mounting means to secure said guide plate means to said object and to maintain said guide plate means in contact with said object, said mounting means being adapted to allow pivotal movement of said guide plate means relative to said object to maintain a first portion of said guide plate means in contact with said object while permitting said angle controlling means to vary the distance between a second portion of said guide plate means and said object.

2. The sawing guide of claim 1 wherein said guide plate means includes a flat surface for engaging the flat base plate of said circular saw and an upstanding shoulder portion extending above said flat surface for engaging an edge of said flat base plate.

3. The sawing guide of claim 2 wherein said mounting means extends away from said guide plate means in a direction opposite to that of said flat surface, said first and second portions of said guide plate means facing opposite to the direction of said flat surface.

4. The sawing guide of claim 3 wherein said mounting means is connected to said guide plate means between the first and second portions thereof, said mounting means including a press plate means for contacting said object on a surface thereof opposite to that contacted by said guide plate means, and swivel bolt means pivotally connected to said guide plate means extending between said guide plate means and said press plate means, said swivel bolt means operating to draw said press plate and guide plate means together against said object.

5. The sawing guide of claim 4 wherein corresponding slots are formed in said guide plate and press plate means, said mounting means including a plate engaged against said guide plate means and a U-shaped stirrup secured to said plate and extending through the slot in said guide plate means, said swivel bolt means having an opening at one end thereof for receiving said stirrup, the opposite end of said swivel bolt means extending through the slot in said press plate means.

6. The sawing guide of claim 5 wherein a groove is formed in the flat surface of said guide plate means adjacent said upstanding shoulder portion and a recess is formed in said flat surface to receive said plate.

7. The sawing guide of claim 4 wherein said angle controlling means includes a pitch block having at least six sides, the sides being dimensioned and formed to meet at angles such that when the pitch block is inserted between the guide plate means and object to be cut, engagement of different sides of the pitch block with the guide plate means will vary the inclination of the guide plate means relative to the object.

* * * * *